(12) United States Patent
Pittelko et al.

(10) Patent No.: US 9,009,431 B2
(45) Date of Patent: Apr. 14, 2015

(54) VIRTUAL SNAPSHOT SYSTEM AND METHOD

(75) Inventors: Michael H. Pittelko, Chaska, MN (US); Mark David Olson, Bloomington, MN (US)

(73) Assignee: Compellent Technologies, Eden Prairie, MN (US)

( * ) Notice: Subject to any disclaimer, the term of this patent is extended or adjusted under 35 U.S.C. 154(b) by 452 days.

(21) Appl. No.: 13/482,183

(22) Filed: May 29, 2012

(65) Prior Publication Data

US 2013/0326171 A1  Dec. 5, 2013

(51) Int. Cl.
*G06F 12/00* (2006.01)
*G06F 11/14* (2006.01)
*G06F 3/06* (2006.01)

(52) U.S. Cl.
CPC ........ *G06F 11/1464* (2013.01); *G06F 2201/84* (2013.01); *G06F 11/1451* (2013.01); *G06F 3/065* (2013.01)

(58) Field of Classification Search
CPC ............ G06F 2201/84; G06F 2206/1012; G06F 17/30575; G06F 3/061; G06F 11/1446; G06F 11/1458; G06F 11/1466; G06F 11/1469; G06F 11/2058

USPC .................................................. 711/161, 162
See application file for complete search history.

(56) References Cited

U.S. PATENT DOCUMENTS 7,308,545 B1 * 12/2007 Kekre et al. .................. 711/162
7,613,945 B2    11/2009 Soran et al.

* cited by examiner

*Primary Examiner* — Reginald Bragdon
*Assistant Examiner* — Hannah A Faye-Joyner
(74) *Attorney, Agent, or Firm* — Winthrop & Weinstine, P.A.

(57) ABSTRACT

The present disclosure relates generally to a method and system for creating, replicating, and providing access to virtual snapshots of a disk storage block of a disk storage system or subsystem. In one embodiment, the present disclosure relates to a virtual snapshot accessible to local users of a local data storage device. The virtual snapshot may direct local users to a snapshot stored on computer-readable storage medium at a remote data storage site, but give the appearance as if data of the corresponding snapshot is stored locally. The virtual snapshot is replaced by replication of the snapshot from the remote data storage site to the local data storage device. Each snapshot may relate to data of a logical data volume, the logical data volume being an abstraction of data blocks from one or more physical storage devices.

16 Claims, 6 Drawing Sheets

VIRTUAL SNAPSHOT SYSTEM AND METHOD

FIELD OF THE INVENTION

The present disclosure relates generally to a method and system for creating, replicating, and providing access to virtual snapshots of a disk storage block of a disk storage system or subsystem.

BACKGROUND OF THE INVENTION

Firms and organizations that use disk drive systems for the storage of information may have users in various geographic locations who need access to the data stored in the disk drive system. In order to preserve the data and permit its recovery in the event of system failure or a virus attack, such disk drive systems may generate snapshots of the system at user-defined time intervals. In the event of system failures, the data from shortly before the failure may be recovered through accessing the snapshot. Further, users at various geographic locations may also access such snapshots, either to recover data after a system failure or to access the system as configured at the time the snapshot was created.

In order to minimize the time required for remote users to access such snapshots, and to minimize the I/O load across the system, the system snapshots are often replicated at local sites for access by local users. Thus, a snapshot created may be replicated at any number of local sites and accessed there by local users. Such systems entail certain disadvantages however. For example, local users may have delayed access to a given snapshot because they will not be able to access the local snapshot until it is replicated at the local site. Such delays may similarly delay the recovery of data after a system failure. Further, replicating snapshots at numerous local sites from a single source creates significant I/O load on the source of the data, generally slowing the system.

Thus, there is a need in the art for a method and system to give local users faster access to snapshots, and to reduce the I/O load on the source of such snapshots resulting from the replication of such snapshots at numerous local sites.

SUMMARY OF THE INVENTION

The present disclosure relates generally to a method and system for creating, replicating, and providing access to virtual snapshots of a disk storage block of a disk storage system or subsystem. One embodiment of the present disclosure relates to a method of snapshot data replication between a plurality of data storage sites. The method includes at a first data storage site, generating, at spaced time intervals, a plurality of snapshots for a logical data volume of the first data storage site, the logical data volume being an abstraction of data blocks from one or more physical storage devices. The spaced time intervals may be predetermined time intervals. The method further includes at a second data storage site, for each of the plurality of snapshots generated at the first data storage site, creating a virtual snapshot, accessible to local users of the second data storage site until the corresponding snapshot from the first data storage site is replicated to the second data storage site, the virtual snapshot directing the user to the corresponding snapshot stored at the first data storage site, but giving the appearance to the user that data of the corresponding snapshot is stored locally at the second data storage site. Each snapshot may generally be considered a point-in-time copy of data for at least a portion of the logical data volume since a most previous snapshot. In further embodiments, each snapshot may generally be considered a point-in-time copy of changes in data for at least a portion of the logical data volume since a most previous snapshot. The method may further involve replicating the corresponding snapshot at the first data storage site to the second data storage site, and deleting the virtual snapshot corresponding to each snapshot when the corresponding snapshot from the first data storage site has completed replication to the second data storage site. In some cases, the second data storage site is remotely located from the first data storage site.

In still further embodiments, the method may include at a third data storage site, for each of the plurality of snapshots generated at the first data storage site, creating a virtual snapshot, accessible to local users of the third data storage site until the corresponding snapshot is replicated to the third data storage site, the virtual snapshot directing the user to the corresponding snapshot stored to at least one the first and second data storage sites, but giving the appearance to the user that data of the corresponding snapshot is stored locally at the third data storage site. The third data storage site may be remotely located from at least one of the first and second data storage sites. The method may further include replicating the corresponding snapshot to the third data storage site from at least one the first and second data storage sites.

Another embodiment of the present disclosure also relates to a method of snapshot data replication between a plurality of data storage sites. The method includes creating a virtual snapshot at a local data storage site for each of a plurality of snapshots generated at a remote data storage site, the virtual snapshots accessible to local users of the local data storage site until the corresponding snapshot from the remote data storage site is replicated to the local data storage site, a virtual snapshot directing the user to the corresponding snapshot at the remote data storage site, but giving the appearance to the user that data of the corresponding snapshot is stored locally at the local data storage site. The remote data storage site generates a plurality of snapshots for a logical data volume, the logical data volume being an abstraction of data blocks from one or more physical storage devices. The snapshots at the remote data storage site may be generated at predetermined time intervals. In some embodiments, Each snapshot identifies changes of data for at least a portion of the logical data volume since a most previous snapshot. The method may further involve replicating the corresponding snapshot at the remote data storage site to the local data storage site, and deleting the virtual snapshot corresponding to each snapshot when the corresponding snapshot from the remote data storage site has completed replication to the local data storage site. In some cases, the local and remote data storage sites are part of the same data storage subsystem.

Still another embodiment of the present disclosure relates to a virtual snapshot accessible to local users of a local data storage device. The virtual snapshot may direct local users to a snapshot stored on computer-readable storage medium at a remote data storage site, but give the appearance as if data of the corresponding snapshot is stored locally. The virtual snapshot is replaced by replication of the snapshot from the remote data storage site to the local data storage device. Each snapshot may relate to data of a logical data volume, the logical data volume being an abstraction of data blocks from one or more physical storage devices. Specifically, in some embodiments, each snapshot may identify changes of data for at least a portion of the logical data volume since a most previous snapshot. The local data storage device and the remote data storage site may be part of the same data storage subsystem.

While multiple embodiments are disclosed, still other embodiments of the present disclosure will become apparent to those skilled in the art from the following detailed description. As will be apparent, the invention is capable of modifications in various obvious aspects, all without departing from the spirit and scope of the present disclosure. Accordingly, the drawings and detailed description are to be regarded as illustrative in nature and not restrictive.

DETAILED DESCRIPTION OF THE INVENTION

The present disclosure relates generally to a method and system for creating, replicating, and providing access to virtual snapshots of a disk storage block of a disk storage system or subsystem. The method of the present disclosure is particularly useful in the context of a disk drive system, or virtual disk drive system, such as that described in U.S. patent application Ser. No. 10/918,329, filed on Aug. 13, 2004, now issued as U.S. Pat. No. 7,613,945, which is hereby incorporated by reference herein in its entirety. Such disk drive systems allow the efficient storage of data by dynamically allocating the data across a matrix of disk storage blocks and a plurality of disk drives based on RAID-to-disk mapping. They may protect data from system failures by creating and storing snapshots or point-in-time copies of the system or matrix of disk storage blocks at predetermined time intervals. The snapshots may be used to recover data from right before a system failure, thereby restoring the system as it existed at that time. The point-in-time data of a snapshot may also be used by system users for other purposes, such as testing while the system remains in operation.

When users of a disk drive system are in multiple geographic locations, snapshots may be replicated to local sites for access by local users. Such replication minimizes the delays in access by local users, and also reduces the I/O load across the system. Further, in the event of a system failure or destruction of the system, replication of the snapshots at local sites enables the recovery of data. In practice, snapshots may be replicated at any number of local sites and accessed there by local users.

There are certain disadvantages associated with replication of the snapshots at local sites. For example, local users may have delayed access to a given snapshot because they will not be able to access the local snapshot until it has been replicated in its entirety at the local site. Such delays may similarly delay the recovery of data after a system failure. Further, replicating snapshots at numerous local sites from a single source creates significant I/O load on the source of the data, generally slowing the system.

The method for creating, replicating, and providing access to virtual snapshots of the present disclosure ameliorates these disadvantages. In general, according to the present disclosure, when a snapshot is created at a source location, and replication of the snapshot at local sites is begun, a virtual snapshot is created immediately at each local site. Until the snapshot is created at the local site, the virtual snapshot will permit local users to access the snapshot at the source location. To the local user, the virtual snapshot will appear as if he or she is accessing the snapshot at his or her local site. As the snapshot is replicated at successive local sites, the virtual snapshots may permit local users to access the snapshot at the closest or most complete site at which it has been replicated. When the snapshot is replicated at a local site, it replaces the virtual snapshot, and local users thereafter access the snapshot at their local site. Thus, local users have access to the snapshot immediately, instead of being required to wait until the snapshot is replicated entirely at their local site.

Figure 1:
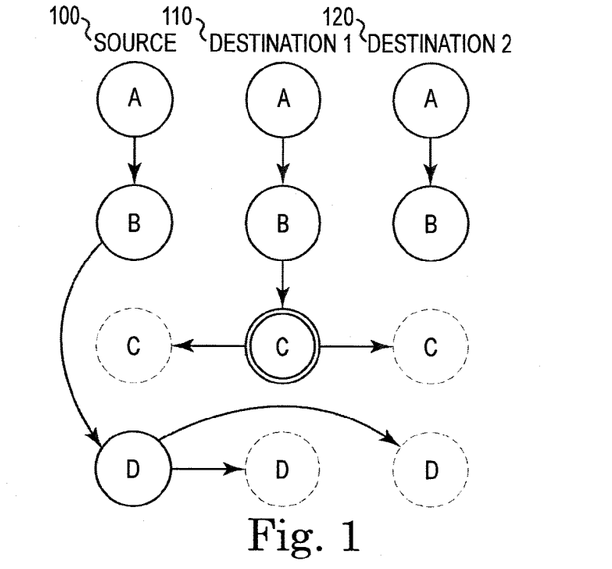
FIG. 1 is a schematic view illustrating the creation and replication of snapshots and the creation of virtual snapshots at local sites.

FIG. 1 shows the use of virtual snapshots in a disk drive system with multiple geographic locations. There are three geographic sites in the illustrated system, source 100, Destination 1 110, and Destination 2 120. However, it is recognized that any suitable sites of two or more, remotely located or not, are suitable for application of the various embodiments of the present disclosure. At source, 100, snapshots A, B, C, and D are generated and stored, on a computer-readable storage medium, sequentially. Such snapshots may be generated periodically on a user-defined schedule, or may be created at a user's direction. Each snapshot contains information on the system at the point-in-time at which it is generated, and thus may also be referred to herein as point-in-time copies.

In the illustrated system, when each snapshot is generated and stored at the source, it is replicated to computer-readable storage medium at Destination 1 110 and Destination 2 120, so that it may be accessed at each local sites by local users. The system relatively immediately creates a virtual snapshot at the local sites, which exists until the snapshot is replicated at the local site. Local users who access the virtual snapshot will be able to access the snapshot data at the source before the snapshot is replicated at their local site. To the local user, it appears as if he or she is accessing the snapshot at the local site. Thus, local users will not experience delays associated with the time required to replicate the snapshot at the local site. As shown in FIG. 1, snapshots A and B have been replicated at both Destination 1 110 and Destination 2 120. Snapshot C was replicated in the past, but the local copy at source 100 has been removed, leaving snapshot C at Destination 1 110. Alternatively, snapshot C may have been taken independently at Destination 1 110. In either case, snapshot C does not necessarily need to be replicated to source 100 or Destination 2 120, but may instead be accessed there from other sites via virtual snapshots, if desired. Virtual snapshots D, as shown by the dotted circles, have been created at both Destination 1 110 and Destination 2 120; when local users access these virtual snapshots, they are permitted to access snapshot D at source 100. As shown by the arrows, snapshot D from source 100 is being replicated at Destination 1 110 and Destination 2 120.

Figure 2:
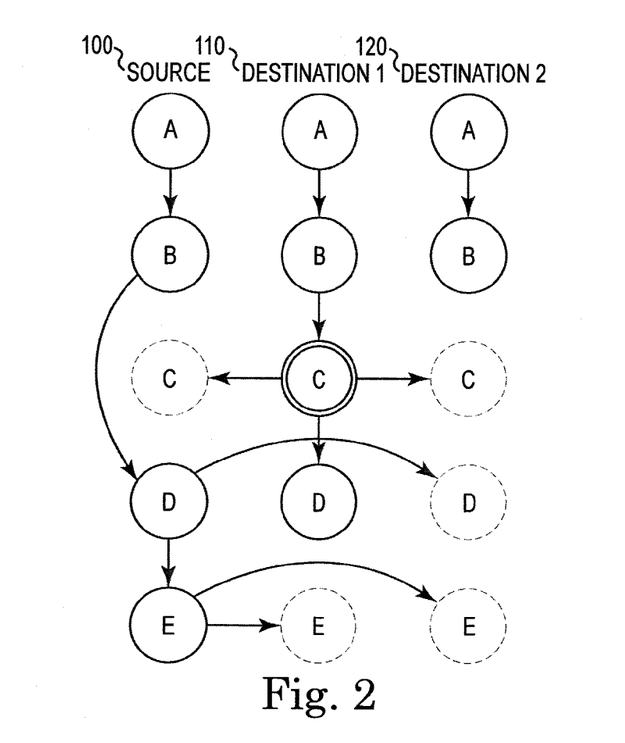
FIG. 2 is a schematic view illustrating the creation and replication of snapshots and the creation of virtual snapshots at local sites.

FIG. 2 shows the next stage of the use of virtual snapshots in a disk drive system with multiple geographic locations. As time has passed since the illustration in FIG. 1, snapshot D from source A has been replicated at Destination 1 110. Virtual snapshot D remains at Destination 2 120, and continues to provide local users access to snapshot D at either source 100 or Destination 1 110. They system continues to replicate snapshot D at Destination 2 120, drawing on either source 100 and/or Destination 1 110. In replicating snapshots at local sites, the system may call on data from any source or combination of sources, and may use that means to reduce the I/O load across the system to an optimal or otherwise desirable level. Meanwhile, snapshot E has been generated at source 110. Virtual snapshots E are relatively immediately created at Destination 1 110 and Destination 2 120, and permit local users at those locations to access snapshot E at source 100. Replication of snapshot E at Destination 1 110 and Destination 2 120 has begun from source 100.

Figure 3:
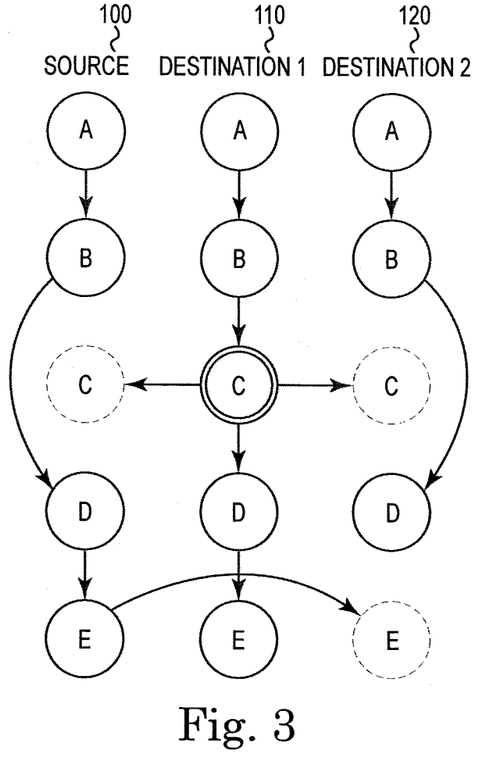
FIG. 3 is a schematic view illustrating the creation and replication of snapshots and the creation of virtual snapshots at local sites.

FIG. 3 shows the next stage of the use of virtual snapshots in a disk drive system with multiple geographic locations. In this illustration, which follows that of FIG. 2, the replication of snapshot D at Destination 2 120 has been completed, allowing local users to access the local snapshot D at Destination 2 120. Similarly, the replication of snapshot E at Destination 1 110 has been completed, again allowing local users to access the snapshot at Destination 1 110. The replication of snapshot E at Destination 2 120 continues, from either source 100 and/or Destination 1 110. In the meantime, local users at Destination 2 120 can continue to access snapshot E from either source 100 or Destination 1 110 via the virtual snapshot E at Destination 2 120.

Figure 4:
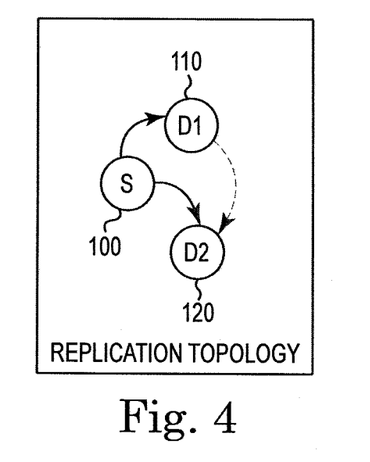
FIG. 4 is a chart illustrating the replication topology for the creation and replication of snapshots.

FIG. 4 illustrates the replication topology for snapshots as illustrated in FIGS. 1-3. As shown, when a snapshot is created at source 100, the snapshot is replicated at both Destination 1 110 and Destination 2 120 from source 100. The dashed arrow further illustrates that the replication of the snapshot at Destination 2 120 may draw on data from the snapshot at Destination 1 110 (or vice versa) after replication of the snapshot at that site is complete.

Figure 5:
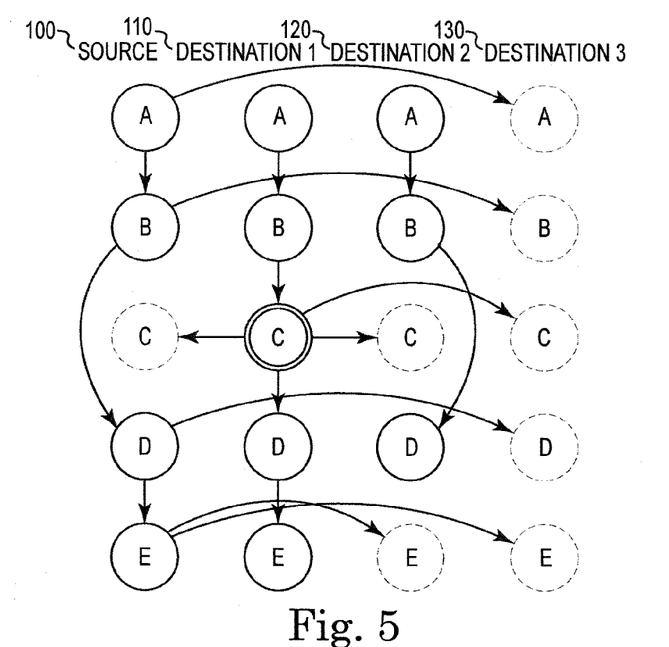
FIG. 5 is a schematic view illustrating the creation and replication of snapshots and the creation of virtual snapshots at local sites.

FIG. 5 shows the use of virtual snapshots in a disk drive system with multiple geographic locations when an additional geographic location, Destination 3 130, is added, for example. As in FIG. 3, snapshots A through E are created at source 100, and have been replicated locally at Destination 1 110, allowing local users at that site to access those snapshots locally. Snapshots A, B, and D have also been replicated locally at Destination 2 120, again allowing local users at that site to access those snapshots locally. The replication of snapshot E at Destination 2 120 continues, from either source 100 and/or Destination 1 110. In the meantime, local users at Destination 2 120 can continue to access snapshot E from either source 100 and/or Destination 1 110 via the virtual snapshot E at Destination 2 120.

When Destination 3 130 is added, virtual snapshots A-E are relatively immediately created at that site, to allow local users to access those snapshots at source 100, Destination 1 110, and/or Destination 2 120. Replication of snapshots A-D at Destination 3 130 then begins from source 100, Destination 1 110, and/or Destination 2 120. Replication of snapshot E at Destination 3 begins from source 100 and/or Destination 1 110.

Figure 6:
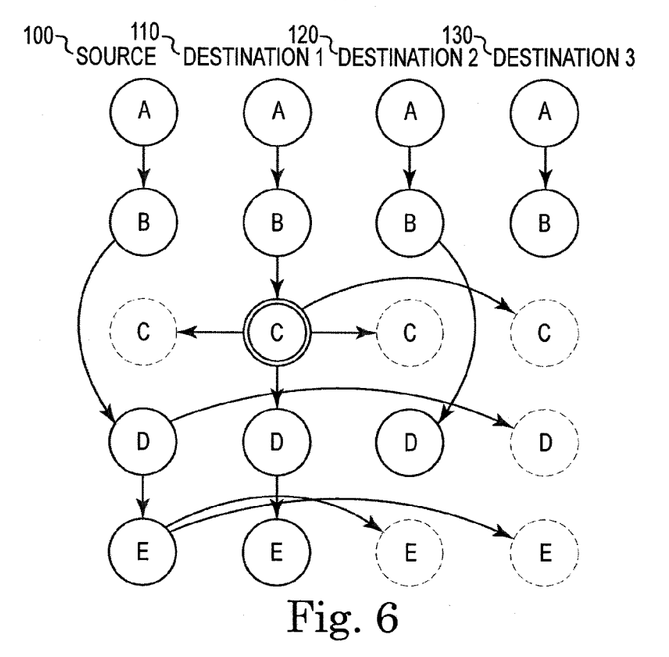
FIG. 6 is a schematic view illustrating the creation and replication of snapshots and the creation of virtual snapshots at local sites.

FIG. 6 shows the next stage of the use of virtual snapshots in a disk drive system with multiple geographic locations when Destination 3 130 is added. In this illustration, replication of snapshots A and B at Destination 3 130 has been completed, allowing local users to access those snapshots at their local site. Replication of snapshots D and E at Destination 3 130 continues.

Figure 7:
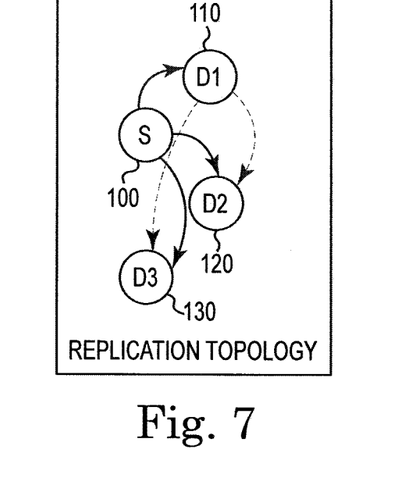
FIG. 7 is a chart illustrating the replication topology for the creation and replication of snapshots.

FIG. 7 illustrates the replication topology for snapshots as illustrated in FIGS. 5-6. As shown, when a snapshot is created at source 100, the snapshot is replicated at Destination 1 110, Destination 2 120, and Destination 3 130, all from source 100. The dashed arrows further illustrate that the replication of the snapshot at Destination 2 120 and Destination 3 130 may draw on data from the snapshot at Destination 1 110 after replication of the snapshot at that site is complete. It is recognized, however, that depending on which site or sites finish replication earlier, the remaining destinations may each draw on any of the source or replicated sites or combinations thereof for replication to its local computer-readable storage medium.

Figure 8:
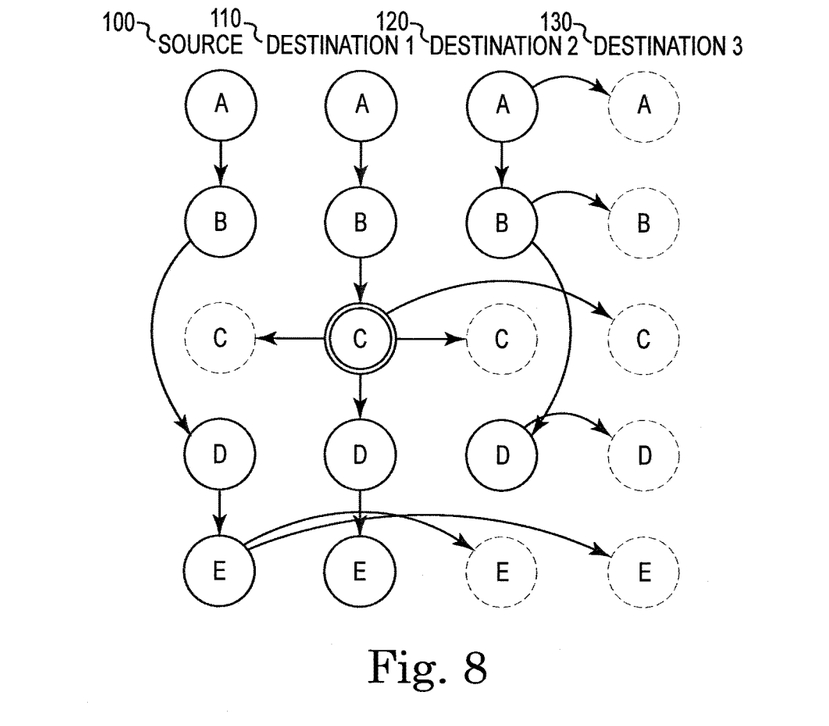
FIG. 8 is a schematic view illustrating the creation and replication of snapshots and the creation of virtual snapshots at local sites.

FIG. 8 shows an alternative means of using virtual snapshots in a disk drive system with multiple geographic locations. As in FIG. 5, there are four locations: source 1, Destination 1 110, Destination 2 120, and Destination 3 130. Snapshots A through E have been created sequentially at source 100 and replicated at Destination 1 110. Snapshots A, B, and D have also been replicated at Destination 2 120. Snapshot E is in the process of being replicated at Destination 2 120 from either source 100 and/or Destination 1 110. In the meantime, a virtual snapshot of snapshot E has been created at Destination 2 120 so that local users may immediately access snapshot E from source 100 and/or Destination 1 110.

When Destination 3 130 is added, virtual snapshots A-E are relatively immediately created at that site, to allow local users to access those snapshots at source 100, Destination 1 110, and/or Destination 2 120. Replication of snapshots A-D at Destination 3 130 then begins from Destination 2 120 (and/or Destination 1 110). Replicating the snapshots from this location can reduce the I/O load on source 100. Replication of snapshot E at Destination 3 begins from source 100 and/or Destination 1 110.

Figure 9:
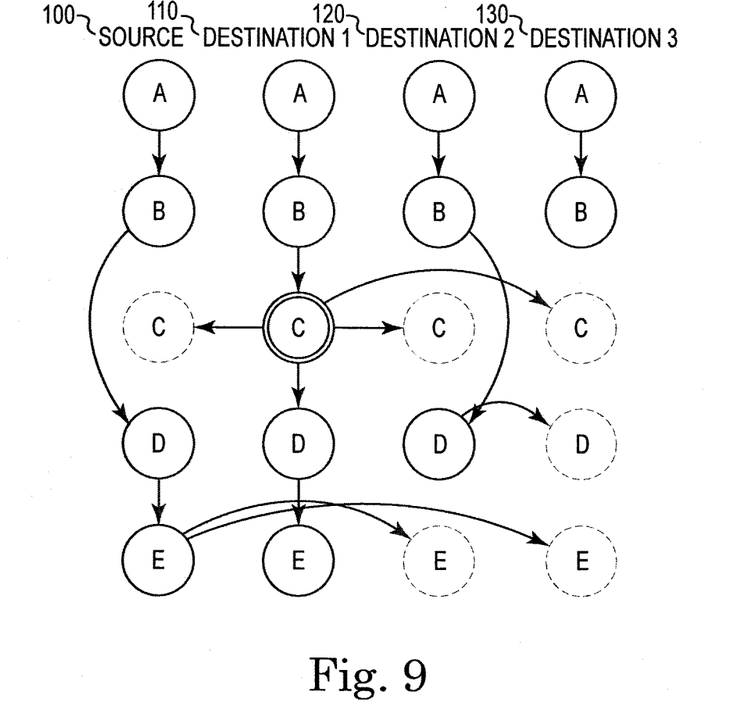
FIG. 9 is a schematic view illustrating the creation and replication of snapshots and the creation of virtual snapshots at local sites.

FIG. 9 shows the next stage in the alternative means of using virtual snapshots in a disk drive system with multiple geographic locations. In this illustration, replication of snapshots A and B at Destination 3 130 is complete. Replication of snapshot D at Destination 3 130 from Destination 2 120 (and/or Destination 1 110) and replication of snapshot E from source 100 and/or Destination 1 110 continues.

Figure 10:
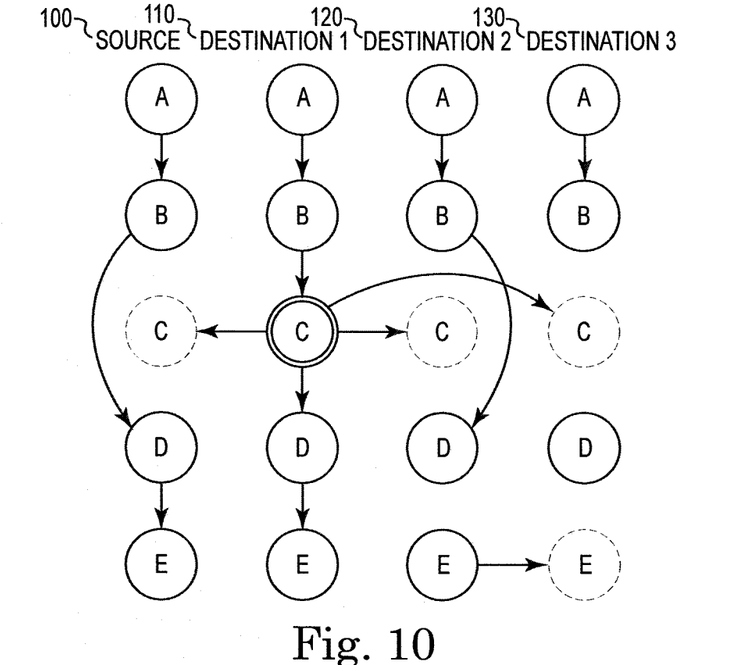
FIG. 10 is a schematic view illustrating the creation and replication of snapshots and the creation of virtual snapshots at local sites.

FIG. 10 shows the next stage in the alternative means of using virtual snapshots in a disk drive system with multiple geographic locations. In this illustration, replication of snapshots A, B, and D at Destination 3 130 is complete. Additionally, replication of snapshot E at Destination 2 120 is complete. With the completion of this replication, replication of snapshot E at Destination 3 130 is now done from Destination 2 120, reducing the I/O load on source 100 and/or Destination 1 110.

Figure 11:
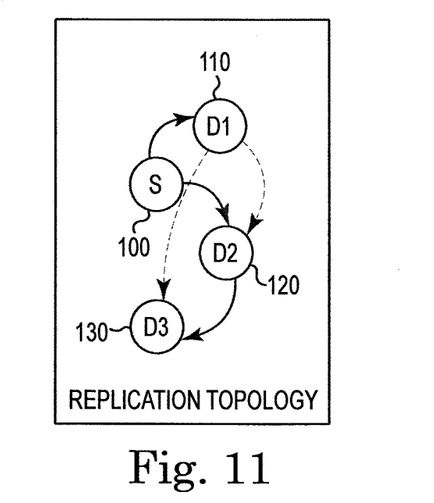
FIG. 11 is a chart illustrating the replication topology for the creation and replication of snapshots.

FIG. 11 illustrates the replication topology for snapshots as illustrated in FIGS. 8-10. As shown, when a snapshot is created at source 100, the snapshot is replicated at Destination 1 110 and Destination 2 120 from source 100. The dashed arrow from Destination 1 110 to Destination 2 120 further illustrate that the replication of the snapshot at Destination 2 120 may draw on data from the snapshot at Destination 1 110 after replication of the snapshot at that site is complete. Further, as illustrated, the snapshot at Destination 3 130 is replicated from Destination 2 120, when replication of the snapshot at that site is complete. The dashed arrows from Destination 1 110 to Destination 2 120 and Destination 3 130 illustrate that replication of the snapshot at Destinations 2 and 3 may also draw on data from Destination 1. It is recognized, however, that depending on which site or sites finish replication earlier, the remaining destinations may each draw on any of the source or replicated sites or combinations thereof for replication to its local computer-readable storage medium.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A method of snapshot data replication between a plurality of data storage sites, the method comprising:
    at a first data storage site, generating, at spaced time intervals, a plurality of snapshots for a logical data volume of the first data storage site, the logical data volume being an abstraction of data blocks from one or more physical storage devices; and
    at a second data storage site, for each of the plurality of snapshots generated at the first data storage site, creating a virtual snapshot, accessible to local users of the second data storage site until the corresponding snapshot from the first data storage site is replicated to the second data storage site, the virtual snapshot directing the user to the corresponding snapshot stored at the first data storage site, but giving the appearance to the user that data of the corresponding snapshot is stored locally at the second data storage site.

2. The method of claim 1, wherein each snapshot is a point-in-time copy of data for at least a portion of the logical data volume since a most previous snapshot.

3. The method of claim 1, wherein each snapshot is a point-in-time copy of changes in data for at least a portion of the logical data volume since a most previous snapshot.

4. The method of claim 3, wherein the spaced time intervals are predetermined time intervals.

5. The method of claim 3, further comprising replicating the corresponding snapshot at the first data storage site to the second data storage site.

6. The method of claim 5, further comprising deleting the virtual snapshot corresponding to each snapshot when the corresponding snapshot from the first data storage site has completed replication to the second data storage site.

7. The method of claim 6, wherein the second data storage site is remotely located from the first data storage site.

8. The method of claim 1, further comprising at a third data storage site, for each of the plurality of snapshots generated at the first data storage site, creating a virtual snapshot, accessible to local users of the third data storage site until the corresponding snapshot is replicated to the third data storage site, the virtual snapshot directing the user to the corresponding snapshot stored to at least one the first and second data storage sites, but giving the appearance to the user that data of the corresponding snapshot is stored locally at the third data storage site.

9. The method of claim 8, wherein the third data storage site is remotely located from at least one of the first and second data storage sites.

10. The method of claim 8, further comprising replicating the corresponding snapshot to the third data storage site from at least one the first and second data storage sites.

11. A method of snapshot data replication between a plurality of data storage sites, the method comprising:
    creating a virtual snapshot at a local data storage site for each of a plurality of snapshots generated at a remote data storage site, the virtual snapshots accessible to local users of the local data storage site until the corresponding snapshot from the remote data storage site is replicated to the local data storage site, a virtual snapshot directing the user to the corresponding snapshot at the remote data storage site, but giving the appearance to the user that data of the corresponding snapshot is stored locally at the local data storage site;
    wherein the remote data storage site generates a plurality of snapshots for a logical data volume, the logical data volume being an abstraction of data blocks from one or more physical storage devices.

12. The method of claim 11, wherein the snapshots at the remote data storage site are generated at predetermined time intervals.

13. The method of claim 12, wherein each snapshot identifies changes of data for at least a portion of the logical data volume since a most previous snapshot.

14. The method of claim 11, further comprising replicating the corresponding snapshot at the remote data storage site to the local data storage site.

15. The method of claim 14, further comprising deleting the virtual snapshot corresponding to each snapshot when the corresponding snapshot from the remote data storage site has completed replication to the local data storage site.

16. The method of claim 11, wherein the local and remote data storage sites are part of the same data storage subsystem.

* * * * *